Dec. 26, 1967  H. W. E. SCHLITT  3,359,805
INERTIAL NAVIGATION SYSTEMS
Filed Feb. 10, 1965  3 Sheets-Sheet 1

INVENTOR.
HELMUT W. E. SCHLITT
BY
Bean, Brooks, Buckley + Bean
ATTORNEYS

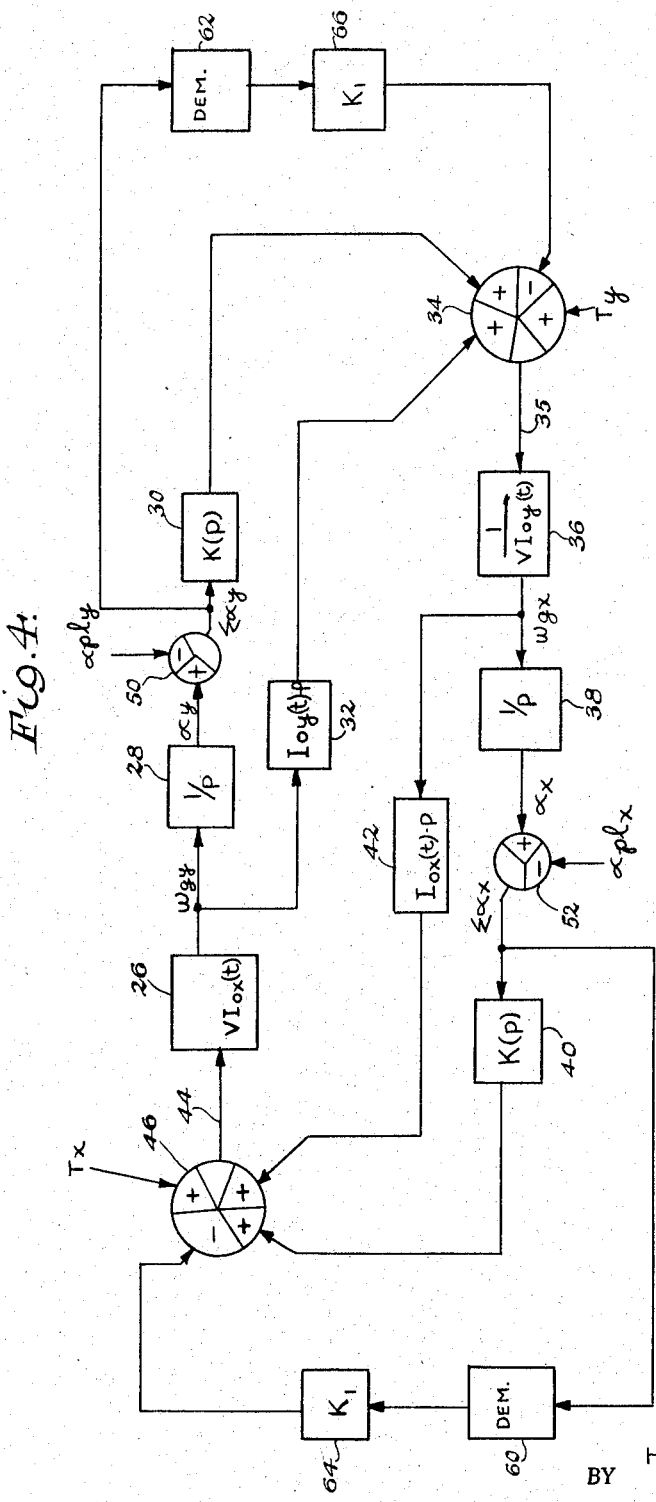

United States Patent Office 3,359,805
Patented Dec. 26, 1967

3,359,805
INERTIAL NAVIGATION SYSTEMS
Helmut W. E. Schlitt, Woodland Hills, Calif., assignor to Bell Aerospace Corporation, Wheatfield, N.Y.
Filed Feb. 10, 1965, Ser. No. 431,593
7 Claims. (Cl. 74—5.6)

ABSTRACT OF THE DISCLOSURE

A gyroscope having a rotor which is unbalanced about its spin axis. Pick-off and torquer members are provided to cancel out precessions induced by wander or drift and which are present at frequencies related to the speed of rotation of the rotor due to the rotor unbalance.

---

Figure 2:
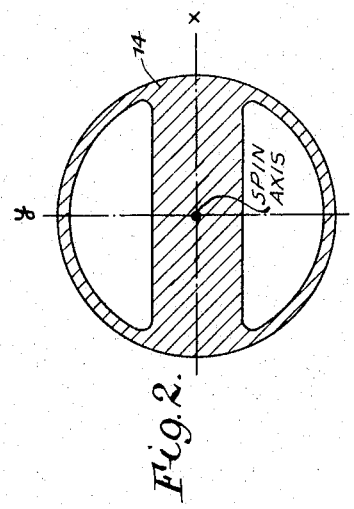

This invention relates to gyroscope systems and, more particularly, the invention is concerned with the detection and compensation of drift or wander which may be acting on a gyroscope.

It is well known that gyroscopes exhibit slow wander or drift resulting from slight mass unbalances which may be due to several causes. The amount of drift may vary widely, dependent chiefly upon the precision with which the instrument is manufactured and although drift or wander may be minimized by careful and precise design and manufacture, it cannot be eliminated entirely even by the most exacting techniques. Therefore, if a gyroscope system requires operation extending over substantial periods of time during which correction cannot be made, the cumulative error resulting from drift may easily be of such magnitude as to render the system useless. In copending application Ser. No. 861,140, filed Dec. 21, 1959, now Patent No. 3,176,524, a system is disclosed in which drift rate may be reduced to such value as to permit of operation over extended periods of time without substantial error. The system disclosed in such application, however, is quite complex and costly so that it may not be practical for some situations. It is, therefore, a primary object of this invention to provide a relatively simple and inexpensive gyroscope system for the detection of and compensation for drift.

Drift rate associated with gyroscopes is of such low frequency and amplitude that compensation is initially and chiefly concerned with the detection of drift. The present invention is directed to a novel method of drift detection in which a two-degree-of-freedom gyroscope is provided with a rotor which displays different equatorial moments of inertia about perpendicular axes which are orthogonally related to the spin axis for the rotor. In this manner, drift-inducing torques which may be acting on the gyroscope are made to manifest themselves as oscillatory precession rates about either or both of the stated axes which are perpendicular to the spin axis; which rates are of a frequency related to the rotational velocity of the rotor and which are high enough to permit of their detection as output angles about the stated axes.

Another object of this invention is to provide a novel system as aforesaid wherein the output axes of the gyroscope are each provided with pick-off and torquer means and wherein the system includes compensating means connected between each pick-off means of one output axis and the torquer means of the other output axis.

Another object of the invention resides in a system according to the preceding object wherein the system is made resonant at the frequency of the oscillatory precessions in order to maximize pick-off signals resulting from small drift-inducing torques.

Further, it is an object of this invention to provide a relatively inexpensive gyroscope which exhibits the characteristics of high accuracy, short reaction time, insensitivity to mechanical and electronic changes in the instrument as well as small size and weight.

Figure 3:
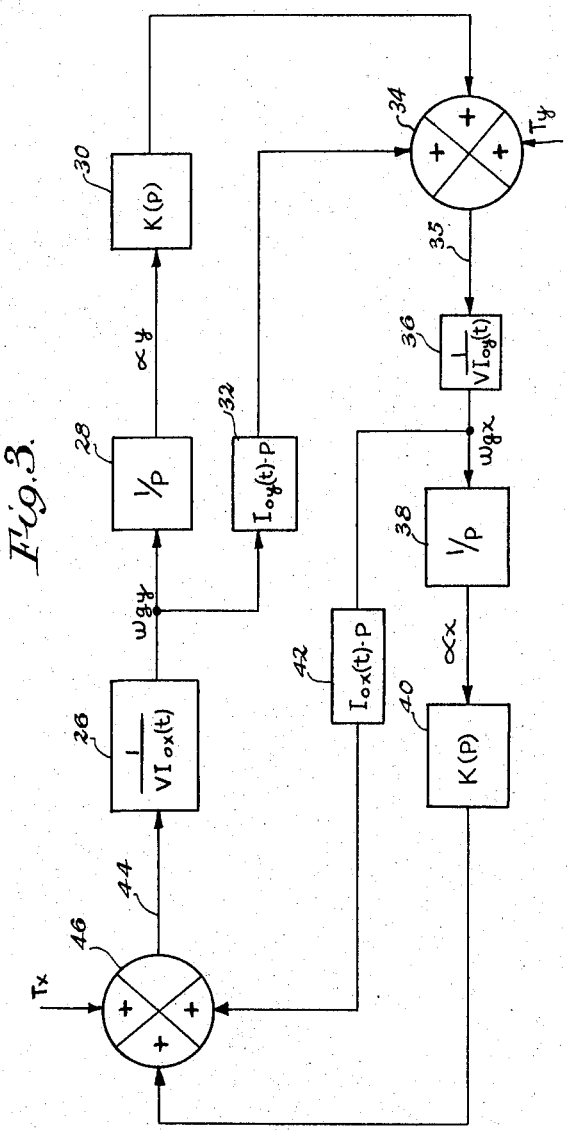
Figure 1:
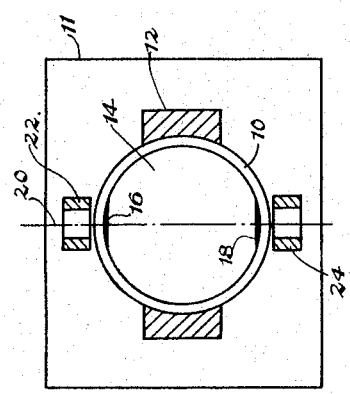
Figure 5:
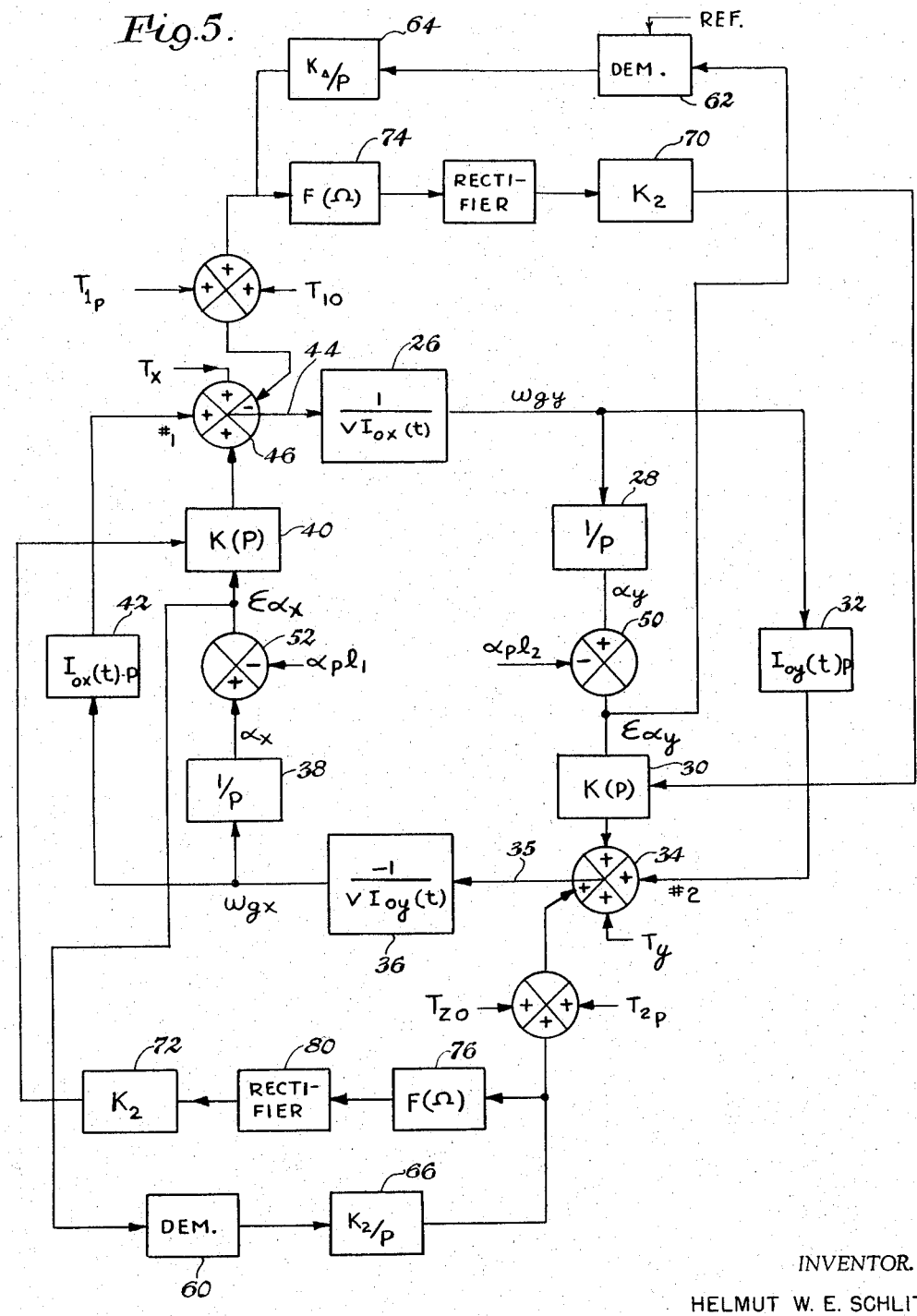

FIG. 1 is a somewhat diagrammatic view showing a gyroscope constructed in accord with this invention;
FIG. 2 is a cross section of a preferred form of rotor according to this invention;
FIG. 3 is a servo diagram illustrative of the principles of operation of this invention;
FIG. 4 is a servo diagram illustrating one embodiment of the invention; and
FIG. 5 is a servo diagram illustrating another embodiment of the invention.

Referring now to FIG. 1, the gyroscope system therein includes a casing 10 mounted for two degrees of freedom relative to a suitable housing or support 11. The casing carries the motor winding 12 by means of which the rotor 14 is rotated at the desired speed. The rotor is preferably spherical and provided with the permanent magnets 16 and 18 diametrically located with respect to each other along the spin axis of the rotor indicated by the dot-dash line 20. These permanent magnets cooperate in the well-known manner with the pick-off and torquer means 22 and 24 carried by the housing or support 11; these means being preferably of the segmental type so that each is capable of cooperation with both axes defining the degreees of freedom for the casing 11. It will be understood that the axes defining the degrees of freedom are mutually perpendicular to each other and to the spin axis 20 of the rotor, as is conventional. For reasons which will hereinafter appear, it is preferred that the rotor be mounted through the medium of hydrodynamic gas bearing means or other low noise type bearing means.

Due to inescapable mass unbalances which may stem from different sources, gyroscopes of the type described suffer from some degree or another of wander or drift. Such drift may be minimized by careful and exacting manufacturing procedures; but even under the most favorable circumstances, the drift rate will be of such magnitude as to introduce intolerable error in the system if operation is continued over long periods of time without correction. Drift rate is of such low frequency and amplitude that contemporary detective means are incapable of determining its instantaneous presence. There is at least one prior art system which tends to cancel the effect of drift, but since drift is normally of random nature, such systems are still unpredictable as to effect and, in any event, do not relay upon the detection of drift.

In the aforesaid copending application, on the other hand, drift detection is involved; drift rate is made to manifest itself as a sufficiently high frequency movement as to permit its detection by contemporary means. The present invention accomplishes the same result, albeit by different means; the aforesaid copending application utilizes a varying angular momentum for the gyroscope rotor while the instant invention is based upon a gyroscope rotor which displays, relative to a stationary coordinate system, variable equatorial moments of inertia. Thus, as shown by way of example in FIG. 2, the spherical rotor 14 is provided with a mass distribution such that for the position shown, the moment of inertia about the axis $x$ defining one degree of freedom is significantly smaller than the moment of inertia about the axis $y$ defining the other degree of freedom. It will be appreciated that these moments of inertia in a stationary coordinate system will not remain the same as described but will, due to the spinning motion of the rotor, vary in a fashion related to the rotational speed of the rotor. To illustrate this, it will be noted that after 90° of rotation, the moment of inertia about the $y$ axis will equal the moment of inertia about the $x$ axis for the position shown in FIG. 2, and vice versa.

For this reason, it will be clear that a drift-inducing torque which may be acting about the $x$ axis of the stationary coordinate system will result in a precession velocity or rate about the $y$ axis of such coordinate system which varies periodically with the varying moment of inertia which presents itself about the torque axis $x$, and vice versa. From dynamics, this relationship may be expressed as follows:

$$g = \frac{T}{v \cdot I_o(t)}$$

where $v$ = spin velocity of the rotor
$g$ = angular drift rate of the gyroscope
$T$ = drift-inducing torque
$I_o(t)$ = instantaneous moment of inertia about the torque axis ($x$ or $y$) under consideration, as a function of time Further, it can be shown that $I_o(t)$ is approximately equal to $I_o(1a \cos 2vt)$, where $I_o$ is the average moment of inertia of the rotor about the torque axis under consideration and $a$ is the modulation factor based upon the difference in moments of inertia about the $x$ and $y$ axis; so that:

$$g = \frac{T}{vI_o(1a \cos 2vt)}$$

Thus, the presence of a drift-inducing torque may be detected by measuremnet of its $2v$ frequency components in its drift rate.

To illustrate better the concept of the present invention, reference is had at this time more particularly to FIG. 3. As shown, the total torque inducing the effect of a drift-inducing $T_x$ about the $x$ axis will be operated upon by the gyro transfer function for this axis as indicated by the box 26 to produce the drift rate $gy$ about the $y$ axis which, by virtue of the normal integrating action of the gyro, as indicated by the inverse differential operator $p$ in box 28, will produce the output angular movement $y$ about the $y$ axis. This output movement is affected by the mutual restoring and damping torque $K(p)$ of the gyro rotor relative to its support and this is represented in FIG. 3 by the box 30. Considering the moment of inertia $I_{oy}(t)$ of the gyro in the $y$ axis, an additional torque effect of this moment and the precession acceleration $gy$, represented by the box 32, acts in the $y$ axis. These torques, plus any drift-inducing torque $T_y$ about the $y$ axis cumulate, as indicated by the summation point 34, to produce the total torque at 35 acting about the $y$ axis. In similar fashion, the boxes 26 and 36; 28 and 38; 30 and 40; and 32 and 42 having similar function, the total torque at 44 acting about the $x$ axis is produced by the cumulative effect at the summation point 46. Thus, from FIG. 3, it will be evident that the torque $T_x$ and/or $T_y$ will tend to produce oscillatory precession about the opposite axis, bearing in mind that the moments of inertia about the stationary $x$ and $y$ axes are periodically varying due to the rotational motion of the rotor.

FIG. 4 illustrates an operative embodiment of the invention. In this figure, in addition to the description of FIG. 3, it will appear that an angular reference has been included. In this case, the reference chosen is a platform stabilized by the gyro, the pick-off angle $_y$ for the $y$ axis being the difference between the angle $_y$ and the platform angle $pl\ y$, as indicated at summing point 50. Similarly, the pick-off angle $_x$ is indicated at the summing point 52. The system shown in FIGS. 3 and 4 contains two fourth order resonance circuits and may be resonated at the frequency $2v$ by proper feedback methods, the latter being incorporated in FIG. 4. The desirability of tuning the system to the frequency $2v$ of course stems from the fact that, as stated before, the presence of drift-inducing torque may be detected at this frequency. At the same time, it will be appreciated that the total torque at 35 or 44 (FIGS. 3 or 4) must not contain a component proportional to $I_{oy}(t)$ or $I_{ox}(t)$, since such a component would necessarily result in a constant drift rate which could not, of course, be detected. From a practical standpoint, such proportional torques would be generated by anisometric radial inhomogeneities of the gyro rotor in conjunction with external fields acting normal to the spin axis of the rotor.

Thus, by avoiding torque components proportional to $I_o(t)$ and providing resonance for the system at the frequency $2v$ a simplified and highly accurate system may be obtained. Additional advantages are that the system may be made compact and of light weight.

In FIG. 4, an undamped resonance is accomplished by proper augmentation of the natural transfer characteristics of $K(p)$ so that, in effect, there is zero damping at the frequency $2v$. With zero damping in the system for the resonance frequency $2v$, the precession signal will grow with time in the presence of drift-inducing torques. Moreover, this signal or signals will be oscillatory and will be in quadrature with the periodic variations in precession rate resulting from such torques in the respective $x$ and $y$ axes. If the signals are initially too small to be detected, time for sufficient build-up will be required for detection, however, the gyro pick-off signal or signals ($\Sigma\alpha_x$ and $\Sigma\alpha_y$) at the frequency $2v$ are demodulated respectively at 60 and 62 and amplified at suitable gain $K_1$ as indicated at 64 and 66 and fed back to the torquer means 24 (FIG. 1) such that the drift-inducing torque $T_x$ and $T_y$ are eliminated and the signals $\Sigma\alpha_x$ or $\Sigma\alpha_y$ disappear. This feedback is illustrated in the servo diagram of FIG. 4 as at the summation points 34 and 46.

The demodulators 60 and 62 are constructed such that their reference frequencies are in phase with the varying equatorial moments of inertia about the corresponding axes $x$ and $y$ so that only the growing oscillations will be detected.

The reference for the system, the platform in the specific embodiment, may give rise to noise in the $2v$ frequency region which represents an additional excitation for the system. However, automatic compensation for this noise will result such that, for constant amplitude of noise, the steady state torque reduces to zero; while for random noise amplitude at the $2v$ frequency, the error is bounded and does not grow indefinitely. To appreciate this effect, it will be realized that a component from $pl\ y$ at the $2v$ frequency and in phase with the periodic variation of moment of inertia about the $x$ axis $I_ox(t)$ will be detected by the demodulator 62 acting on the signal $y$ and will be compensated by the $y$ axis torquer. Since the damping in the system for the resonance frequency $2v$ is zero, components of the precession rate at the frequency $2v$ are integrated so that, for constant amplitude of this frequency component of noise, the steady state error reduces to zero. For a random amplitude component of noise at the $2v$ frequency, the integration will cause the error to be bounded. It should be noted that the aforesaid noise component, that is one which is in phase with $I_ox(t)$, will be in quadrature with the varying moment of inertia about the $y$ axis $I_oy(t)$ so that such component will not be detected by the demodulator 60 acting on the signal $x$ and, in this case, the $x$ axis compensation loop is inactive.

Similarly, for a $2v$ noise component in quadrature with the varying moment of inertia about the $x$ axis $I_ox(t)$, the $y$ axis compensation loop will be inactive while, at the same time, the stated noise component will be in phase with $I_oy(t)$ so that it is compensated in the $y$ axis.

In the modification according to FIG. 5, provision is made for detection of drift rates of small magnitude without requiring the signal to build up as in FIG. 4. That is to say, in FIG. 5, constant oscillation amplitude is maintained in response to drift rates exceeding a predetermined threshold. This is accomplished by continuous measurement and control of the damping represented by the boxes 30 and 40 and, moreover, the compensating loop for each axis is resonated. Thus, the gain $K_1$ (FIG. 4) of the compensating loops is replaced, in FIG. 5, by an integral $K_o/p$ to effect resonance in these loops, and the damping $K(p)$ is controlled from the outputs of the amplifiers 70 and 72 having inputs from the respective narrow bandpass filters 74 and 76 feeding the rectifiers 78 and 80; it being noted that the filters 74 and 76 pass the resonant frequency oscillations Ω of the respective compensating loops.

To illustrate better the function of the integral terms $K_o/p$ associated with the amplifiers 64 and 66 of FIG. 5, it is pointed out that a pick-off signal of approximately $10^{-2}$ seconds of arc is required for proper operation. However, a drift rate of $1/10,000$ degrees per hour will result in periodic pick-off deflections of only about $6.4 \times 10^{-8}$ seconds of arc if the spin frequency of the rotor is chosen to be 125 cycles per second. In order to increase the pick-off signal to the required magnitude of $10^{-2}$ seconds of arc, amplification by integration of approximately $1.57 \times 10^5$ is required.

To appreciate the fact that the system exhibits a steady state oscillation of constant amplitude with zero damping, reference is had to the transfer function of the gyro system in the $x$ and $y$ axis:

$$\frac{\alpha}{T} = \frac{K}{p + K_d}$$

where $p = d/dt$
$\alpha$ = gyro pick-off angle for axis involved
$T$ = torque applied to gyro (at 35 or 44)
$K_d$ = damping constant of the system
$K$ = constant From the above, the following characteristic equation for each compensating loop is obtained:

$$\frac{K}{p+K_d} \cdot \frac{K_o}{p} + 1 = 0$$

which can be written:

$$p^2 + Kd \cdot p + KK_o = 0$$

which represents a second order differential equation with the damping $K_d$.

The transfer function for the remaining gyroscopic error torque ΔT of each compensating loop is:

$$\frac{\Delta T}{T} = \frac{p^2 + K_d \cdot p}{p^2 + K_d p + KK_o}$$

From this, it will be apparent that the remaining torque error of a constant torque T is always zero, even if the damping constant $K_d$ is not zero. However, the damping constant $K_d$ is reduced to zero to maximize the pick-off signal resulting from a small torque by controlling the amplitude of the oscillations in the compensating loops through the damping in $K(p)$. Thus, there is a steady state oscillation of constant amplitude and zero damping in each compensating loop which is equivalent to zero damping in each axis of the gyro system.

I claim:

1. A gyroscope system characterized by minimization of random drift, which comprises,
a two-degree-of-freedom gyroscope having a rotor mounted for movement about a pair of perpendicular axes orthogonally related to the spin axis of said rotor,
means for driving said rotor,
said rotor having variable moments of inertia about each of said pair of axes so that drift-inducing torque which may be acting about one of said pair of axes will manifest itself in oscillatory precession about the other of said pair of axes, and vice versa,
a pick-off and a torquer on each of said pair of axes,
first compensating means connected between the pick-off of said one axis and the torquer of said other axis,
and second compensating means connected between the pick-off of said other axis and the torquer of said one axis,
said compensating means being effective to counteract drift-inducing torque which may be acting about the respective axes.

2. A gyroscope system characterized by minimization of drift, comprising,
a platform,
a two-degree-of-freedom gyroscope having a rotor and mounted on said platform in suspension means defining two mutually perpendicular axes for rotation of the gyroscope spin axis relative to said platform,
gyro torquers connected so as to cause gyroscopic precession about each of said axes and rotational pick-off transducers connected so as to measure angular motion of said rotor about each of said axes,
said rotor having a mass distribution such as to produce continuously varying moments of inertia about said axes in response to rotation of said rotor,
and compensating means connected between the pick-off transducer of each axis and the torquer of the other axis.

3. A gyroscope system characterized by minimization of drift, comprising,
a platform,
a two-degree-of-freedom gyroscope including a casing and a rotor journalled in said casing,
said casing being mounted on said platform in suspension means defining two mutually perpendicular axes for rotation of the casing relative to said platform,
torquer means connected to cause gyroscopic precession of said casing about each of said axes and pick-off means connected to measure angular motions of said casing about each of said axes,
said rotor having a mass distribution such as to produce continuously varying moments of inertia about said axes in response to rotation of said rotor,
means for rotating said rotor,
compensating means connected between the pick-off means of each axis and the torquer means of the other axis,
said compensating means being resonant at a frequency twice that at which said rotor is driven.

4. In a gyroscope system, in combination,
angular reference means,
a two-degree-of-freedom gyroscope having a rotor and mounted for movement relative to said angular reference about mutually perpendicular axes,
means for driving said rotor, and said rotor having a mass distribution so as to display continuously varying moments of inertia about said axes as the rotor is driven,
compensating means associated with each of said axes for counteracting drift-inducing torques which may be acting about said axes,
said compensating means including mechanism for detecting periodic precessions, about each of said axes, which are of a frequency related to the rotational speed of said rotor.

5. In a system as defined in claim 4 wherein said compensating means are resonant at said frequency related to the rotational speed of said rotor.

6. In a system as defined in claim 5 wherein said frequency is twice the rotational speed of the rotor.

7. In a system as defined in claim 5, including filter means connected to the compensating means for controlling the natural damping of said rotor in accord with the resonant frequency of said compensating means.

References Cited

UNITED STATES PATENTS

| | | | |
|---|---|---|---|
| 2,991,659 | 7/1961 | Bowden | 74—5.6 |
| 3,191,445 | 6/1965 | Eklund | 74—5.6 |

FRED C. MATTERN, JR., *Primary Examiner.*

J. PUFFER, C. J. HUSER, *Assistant Examiners.*